UNITED STATES PATENT OFFICE.

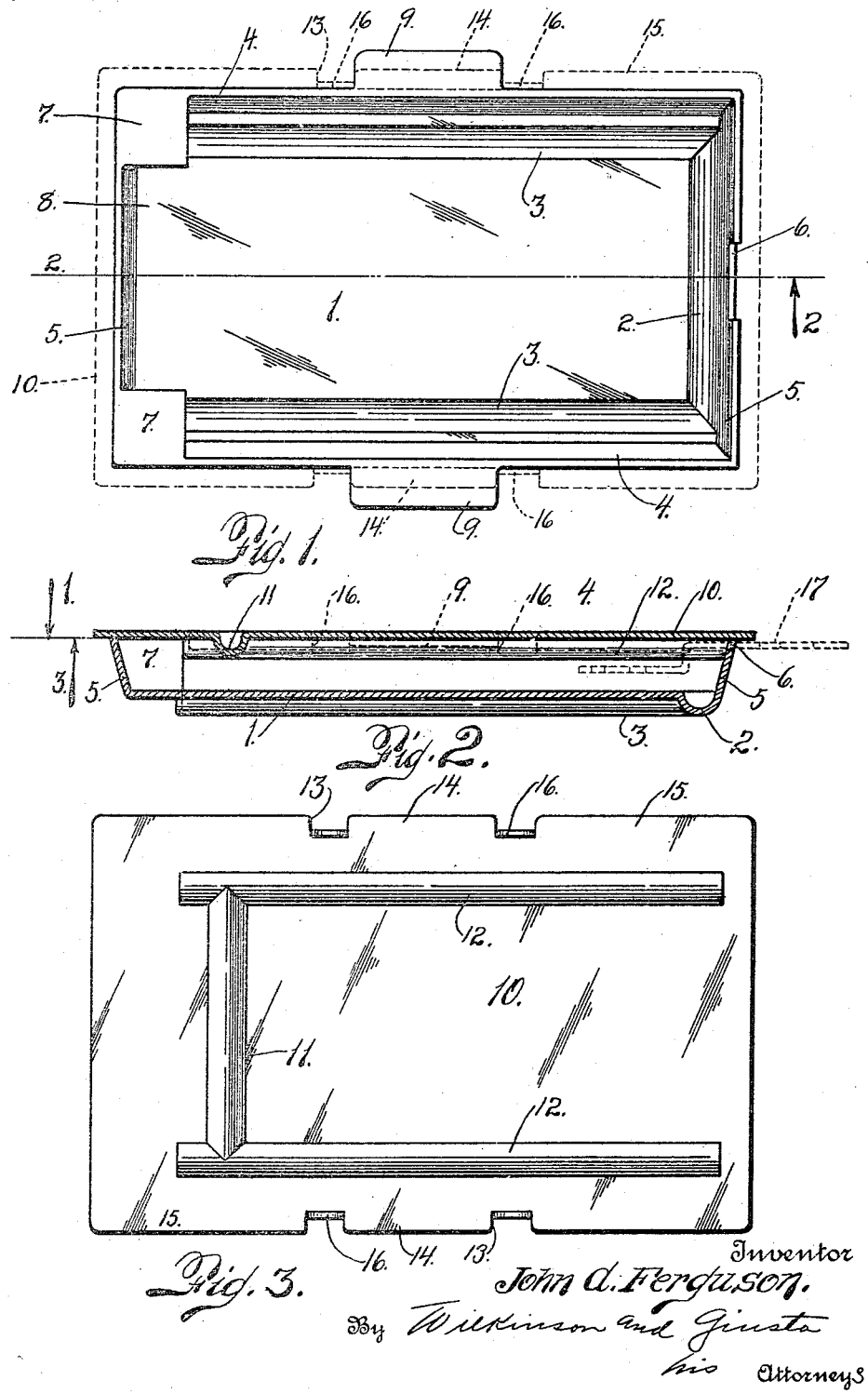

JOHN A. FERGUSON, OF DENVER, COLORADO.

MOLD FOR TILES.

1,244,484. Specification of Letters Patent. Patented Oct. 30, 1917.

Application filed May 25, 1917. Serial No. 170,901.

*To all whom it may concern:*

Be it known that I, JOHN A. FERGUSON, a citizen of the United States, residing at the city and county of Denver and State of Colorado, have invented certain new and useful Improvements in Molds for Tiles; and I do hereby declare the following to be a full, clear, and exact description of the invention, such as will enable others skilled in the art to which it appertains to make and use the same.

This invention relates to improvements in molds for tiles, formed from a suitable plastic substance.

While it may be employed in the manufacture of tiles generally, wherein it is desired that one tile element is laid in overlapped and inter-engaged association with another in tiling a surface, still it is primarily designed for molding "roofing" tiles from a cementitious mixture.

As such cement mixtures have a decided tendency to settle, when in a fairly liquid state, I have found it to be desirable to mold each tile, with its top surface facing downward, in a suitable shallow settling mold pan having an integrally formed closed bottom, so that the heavier cement in part becomes more evenly distributed toward the bottom of the pan, not only providing a smooth, glaze-like finished top surface for the tile, but also producing a somewhat stratiform facing, which, when thoroughly indurated, will uniformly reinforce, as it were, the whole body structure of the tile.

One of the primary objects of the present invention, therefore, is to preserve the superior quality of such tiles as to uniform coherence and finished facing.

Another object is to provide certain novelly combined mold elements to produce a specially formed tile for the purpose set forth, with a minimum of time, labor and expense.

A still further object is to provide certain novel means for centering or holding the novel mold elements in interlocked but readily detachable association against displacement during the molding of the tiles.

With these and other objects in view, the invention consists of the general arrangement and combination of mold elements, more fully appearing in the following description, and the particular features of novelty of which will be more succinctly set forth in the appended claims; but to more clearly understand the details of the invention, reference will now be had to the accompanying drawings, forming a part of this application, in which drawings like characters designate the same parts in the several views, and of which views—

Figure 1, is a top plan view looking down into the interior of the settling mold pan, as indicated by the arrow 1 of Fig. 2, the position of the cover, serving as a pattern element for molding the bottom of a tile, being shown in dotted outline, Fig. 2, is a vertical longitudinal sectional view through the assembled mold, taken along the line 2—2 of Fig. 1, and Fig. 3, is a bottom plan view of the cover or pattern element for forming the bottom of the tiles, looking in the direction of the arrow 3 of Fig. 2.

1 designates the closed bottom of a shallow settling mold pan, the interior surface of which, at one end, is suitably depressed to form a transverse groove 2, and similarly along the sides of the pan are formed longitudinal depressions providing the elongated grooves 3, into which the ends of the transverse groove merge.

4 and 5 designate the side and end walls, respectively, of the settling mold pan, which walls are integrally formed with the bottom thereof, and flare outwardly and upwardly to permit of the ready withdrawal of the tile when molded.

The top edge face of one end wall 5 is cut away slightly to provide a shallow recess 6 to receive and seat the projecting end of a metallic securing element, the inner end of which is adapted to be embedded in the body of the tile while the latter is being molded, as will hereinafter appear.

At the other end of the pan, the interior corners thereof are provided with suitably shaped integral inserts 7, shown as being squared, between which and the adjacent end wall of the pan is formed a restricted space 8.

In order that the pan may be readily handled to invert the same for discharging the tile, when the cement mixture therein has become sufficiently set for withdrawal, suitable hand grips should be provided at the ends or sides of the pan, so that the fingers of the operative will not project over the edges of the pan and come in contact with the molded tile being discharged.

A simple and efficient means for accomplishing this is shown at 9, wherein the sides of the pan are provided with narrow projecting portions, which not only serve as hand grips, but also function additionally with coöperating elements to hold the mold sections, in interlocked but readily detachable association, against displacement during the molding of the tiles, as will further appear.

10 is a "former" plate or pattern element for shaping the bottom surface of the tiles. As shown, it is of rectangular shape and of greater dimensions than the open top of the settling mold pan, being adapted to be seated on the top edge faces of the flaring side and end walls of the latter, and serving like a cover therefor.

The plate 10 is suitably stamped to provide its lower or bottom face with the transverse depression 11 and the longitudinal side edge depressions 12, forming pattern beads for molding corresponding grooves in the bottom of the tile being molded, as clearly shown in Figs. 2 and 3.

The pattern beads 12 extend substantially the length of the settling mold pan, with one of their ends adapted to abut against one face of the inserts 7, while they are spaced apart laterally at a distance corresponding to the lateral spacing of the longitudinal grooves 3 formed in the bottom of the pan.

The transverse pattern bead 11 merges, at its ends, into the pattern beads 12, and is disposed at a slight distance from one end of the latter, so that when the "former" plate is properly seated on top of the pan, the transverse bead 11 will be positioned to traverse the restricted open space 8, slightly inside of the plane of the inserts 7, and at the end of the pan opposite to that providing the transverse groove 2 in its bottom, as clearly shown in Fig. 2.

The longitudinal pattern beads 12, however, are disposed in complementary alinement with the longitudinal grooves 3 in the bottom of the pan.

In order to hold the "former" plate in proper position, against displacement, over the open top of the pan, and yet in such relation as to be readily detachable therefrom, I slit the side edges of the plate, as at 13, leaving a central portion 14, which is adapted to rest upon the projections 9, on opposite sides of the pan. Between these central portions 14 and the opposed end portions 15 of the "former" plate, the sections between the slits 13 are bent downwardly, providing narrow depending ears or lugs 16, engaging with their flat faces the outer top edges of the side walls of the pan to prevent lateral displacement of the plate, and also on their edge faces engaging the end edge faces of the projections 9 on the pan, to prevent longitudinal displacement, thus forming a means for centering the plate properly over the top of the pan, as will be clearly understood from these elements shown as dotted in Figs. 1 and 2.

17, indicated in dotted lines Fig. 2, designates an angularly bent metallic securing element or strip, the inner arm of which is provided with apertures and is adapted to be embedded in the cement body of the tiles. The outer arm is seated in the recess 6, during the molding of the tile, and projects beyond that end edge face of the tile, being provided with a keyhole slot for detachable connection with a headed stud or nail in the tiling support.

In molding the tiles, the settling pan is first filled with the fairly liquid cement mixture. The metallic securing element 17 is then set in place, the inner end being pressed down in the soft cement mixture, so that the latter is squeezed up through the apertures in that arm of the securing element, thus anchoring the latter against being pulled out of the molded tile.

The "former" plate or cover 10 is then seated in detachably secured position above the filled pan, as fully described and clearly shown in Fig. 2.

Another settling mold pan may now be superimposed upon the cover of the pan below, and the operation repeated indefinitely in stacked assembly, and the stacks of molds may be set aside to allow the mixture to set, after which the "former" plates may be lifted off of the pans, one by one, as the stacks of molds are reduced, and the pans inverted by means of the hand grip portions 9, when the finished tile readily releases itself from the mold pan.

As initially stated, the tiles are molded with their top surfaces disposed downwardly, so that the heavier cement, settling in part toward the bottom of the pan, provides a smooth, glaze-like finished top surface, in the nature of a stratiform facing, having raised parts or transverse end and longitudinal side beads, functioning as interengaging elements with complementary grooves formed on the bottom of associated tiles when laid.

Similarly, the pattern beads of the "former" plate mold longitudinal edge grooves, on the bottom face of the tile, congruent with the longitudinal beads on the opposite face thereof, and also a transverse groove at the opposite end to the transverse bead on the top face.

The inserts 7 and the intermediate restricted space 8 provide for the formation of recessed corners and a centrally projecting tongue portion at the lower end of the tiles.

The tiles formed by the present mold constructed are what I term "base" or "foundation" tiles, and while no claim is made, in the instant application, to the construction of the tiles themselves, it may not be amiss to generally state their uses.

These "base" tiles are laid somewhat after the fashion of shingles, but in rows spaced apart substantially the width of the tiles, and with the tongue portion at the lower end of an upper tile overlapping the transversely beaded end of a lower one, and the transverse groove in the lower bottom face of an upper tile being interengaged by the transverse bead on the upper top surface of the tile below, as will be obvious.

The lateral spaces between these rows of "base" tiles are covered by "spanner" tiles, which are of the same construction, with the exception that they are slightly shorter, omitting the tongue portion, and are not necessarily provided with the longitudinal beads on their top surfaces.

These "spanner" tiles, therefore, may be molded similarly to the "base" tiles, without departing from the present invention, although a shorter mold pan would be employed, the inserts 7 and the intermediate space 8 being omitted, as well as the longitudinal grooves 3 in the bottom of the pan. Otherwise the molding is the same in both instances.

The upper corners of the "spanner" tiles seat within the recessed corners at the lower ends of the "base" tiles of alternate rows, and the longitudinal grooves in the bottom face of the "spanner" tiles are inter-engaged by the complementary longitudinal beads on the top faces of the "base" tiles of the alternate rows. The transverse groove in the lower bottom face of an upper "spanner" tile is also inter-engaged by the transverse bead on the upper top face of the "spanner" tile below, so that the lower ends of the upper spanner tiles overlap the upper ends of the lower ones, and also cover the recessed corners of the "base" tiles of alternate rows, providing a substantial leak-proof tiling.

Having thus fully disclosed my invention, it will be understood that I do not limit myself to the exact details set forth, excepting as come within the purview of the ensuing claims and a reasonable construction of the scope thereof contemplating a fair range of equivalents.

What I do claim as new and patentable, is:—

1. In tile molds, functioning as and for the purposes set forth, a settling pan having a closed bottom and flaring end and side walls; in combination with a pattern plate closure for the open top of said pan, the inside face of the bottom of said pan and the underneath face of said pattern plate closure being respectively provided with appropriate pattern grooves and pattern beads; and means for centering said pattern plate closure, in readily detachable interlocked relation, over the top of said pan, substantially as described.

2. In tile molds, functioning as and for the purposes set forth, a settling pan having a closed bottom and flaring end and side walls; in combination with a pattern plate closure for the open top of said pan, the inside face of the bottom of said pan and the underneath face of said pattern plate closure being respectively provided with appropriate pattern grooves and pattern beads; and means for centering said pattern plate closure, in readily detachable interlocked relation, over the top of said pan, comprising hand grip elements projecting outwardly from the sides of said pan, and depending ears, on said pattern plate closure, spaced to engage the sides of said pan and the end edges of said hand grip elements, substantially as described.

3. In tile molds, functioning as and for the purposes set forth, a settling pan having a closed bottom and flaring end and side walls, said closed bottom provided on its inside face with a transverse groove extending along one end wall thereof; in combination with a pattern plate closure, of greater dimensions than the open top of said pan, having longitudinal pattern beads disposed along its underneath face and a transverse pattern bead merging into said longitudinal beads toward one end thereof, said closure being seated, in assembling, upon the open top of said pan, with said transverse pattern bead depending into said pan at the opposite end thereof from said transverse groove in its bottom, substantialy as described.

4. In tile molds, functioning as and for the purposes set forth, a settling pan having a closed bottom and flaring end and side walls, interior longitudinal grooves being formed along the side walls and a transverse groove along one end wall thereof and merging into said longitudinal grooves, the other end of the pan having corner inserts, with a tongue forming space therebetween, abutting adjacent ends of the longitudinal grooves; in combination with a pattern plate closure for the top of said pan, provided with laterally spaced longitudinal pattern beads, on its underneath face, and with a transverse pattern bead, merging into said longitudinal beads toward one end thereof, said closure being seated, in assembling, with said longitudinal beads congruently alined with said longitudinal grooves, and with said transverse bead disposed at the end of said pan distant from said transverse groove in its bottom, substantially as described.

In testimony whereof, I affix my signature.

JOHN A. FERGUSON.

Copies of this patent may be obtained for five cents each, by addressing the "Commissioner of Patents, Washington, D. C."